US006964196B2

(12) United States Patent
Turner et al.

(10) Patent No.: US 6,964,196 B2
(45) Date of Patent: Nov. 15, 2005

(54) RESONANT PIVOTING SURFACE WITH INERTIALLY COUPLED ACTIVATION

(75) Inventors: Arthur Monroe Turner, Allen, TX (US); Andrew S. Dewa, Plano, TX (US); Mark W. Heaton, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/440,902

(22) Filed: May 19, 2003

(65) Prior Publication Data

US 2004/0007069 A1 Jan. 15, 2004

Related U.S. Application Data

(60) Provisional application No. 60/394,321, filed on Jul. 8, 2002.

(51) Int. Cl.[7] .................................................. G01H 13/00
(52) U.S. Cl. ........................ 73/580; 73/24.04; 73/24.06
(58) Field of Search ............................... 73/580, 24.06, 73/24.04, 61.49, 61.75, 61.79, 64.53

(56) References Cited

U.S. PATENT DOCUMENTS 4,699,006 A * 10/1987 Boxenhorn .............. 73/514.15
5,629,790 A * 5/1997 Neukermans et al. ....... 359/198
6,331,909 B1 * 12/2001 Dunfield ..................... 359/199
6,450,013 B1 * 9/2002 Gallagher .................. 73/24.06

OTHER PUBLICATIONS

Asai, Nobuaki, et al., *A Novel High Resolution Optical Scanner Actuated by Aerosol Deposited PZT Films*; IEEE 2003; pp 247–250; National Institute of Advanced Industrial Science and Technology; Namiki, Tsubkuba, Japan.

Harris, Michael G., et al.; *A Piezoelectric Actuated Scanning Mirror System Utilizing A Type One Control Loop*; IEEE 1989; pp 1267–1374; Session 12CA; Proceedings–1989 Southeastern.

Ikeda, Masaaki, et al., *PZT Thin–Film Acutator Driven Micro Optical Scanning Sensor By 3D Integration of Optical and Mechanical Devices*; IEEE 1999; pp 435–440; Omron Corporation; Tsukuba–city, Ibaraki, Japan.

(Continued)

*Primary Examiner*—John E. Chapman
(74) *Attorney, Agent, or Firm*—William B. Kempler; W. James Brady, III; Frederick J. Telecky, Jr.

(57) ABSTRACT

A system and method for providing resonant movement about a first axis. A functional surface supported by a first pair of torsional hinges is driven into resonant oscillations about the first axis by inertially coupling energy through the first pair of torsional hinges. The resonant movement may be moved orthogonally on the target area by a gimbals portion of the functional surface pivoting about a second axis according to one embodiment. The resonant oscillation of the functional surface is monitored to detect changes in frequency due to mass changes of the functional surface.

2 Claims, 11 Drawing Sheets

OTHER PUBLICATIONS

Ikeda, Masaaki, et al., *Two Dimensional Silicon Micromachined Optical Scanner Integrated With Photo Detector and Piezoresistor*; Transducers '95, Jun. 25–29, 1995; pp 293–296; vol. 67–B1; Omron Corporation, Tsukuba–city, Ibaraki, Japan.

Kawabata, Tatsuo, et al., *The 2–Dimensional Micro Scanner Integlated with PZT Thin Film Actuator*; Transducers '97; Jun. 16–19, 1997; pp 339–342; Omron Corporation; Tsukuba–city, Ibaraki, Japan.

Konno, Nobuaki, et al.; *Design Optimization & Improved Performance on the Link Beam Driven Miniaturized Scanning Mirro Device*; IEEE 2000; pp 11–12; Institute of Industrial Science; Roppongl, Minato–ku, Tokyo, Japan.

Lee, C K, et al., *Miniature Piezoelectric Actuators: Design Concept, Fabrication and Performance Evaluation*; Smart mater. Struct. 7 (1998) pp. 312–326; printed in the UK.

Smits, Jan G.;*Dynamic And Static Behavior of Piezoelectric Bimorphs With Extenders in Optical Scanners*: IEEE 2000 pp 1093–1096; Radiant Technologies, Albuquerque NM.

Tsaur, Jiunnlye, et al.; *Design and Fabrication of 1D and 2D Micro Scanners Actuated by Double Layered PZT Bimorph Beams*; National Institute of Advanced Industrial Science and Technology; pp 204–205; Namiki, Tsukuba, Japan.

Yamada, K., et al., *A Novel Asymmetric Silicon Micro–Mirror For Optical Beam Scanning Display*; IEEE, 1998, pp 110–115; NEC Corporation; Sagamihara, Kanagawa Japan.

* cited by examiner

RESONANT PIVOTING SURFACE WITH INERTIALLY COUPLED ACTIVATION

This application claims the benefit of U.S. Provisional Application Ser. No. 60/394,321, filed on Jul. 8, 2002, entitled Scanning Functional surface, which application is hereby incorporated herein by reference.

TECHNICAL FIELD

The present invention relates generally to the use of MEMS (micro-electric mechanical systems) devices to provide resonant pivoting or oscillation of a functional surface area. The resonant pivoting may be provided by a dual axis device or a single axis device. A first set of torsional hinges is used for providing the resonant movement by oscillating or pivoting the functional surface about the torsional hinges at the resonant frequency of the device. For some applications, a dual axis device may be appropriate. A dual axis device includes a second pair of torsional hinges for allowing movement about a second axis to control movement of the device in a direction orthogonal to the resonant movement. More specifically, if the functional surface absorbs moisture or otherwise has an affinity to combine with an element or compound, the effective mass of the functional surface will change depending on the amount of absorption or affinity. Since the effective mass of the functional surface determines the resonant frequency on or oscillation of the surface about its axis, change in the resonant frequency can be used to indicate the presence of, and even the amount of, an element or compound in the environment.

BACKGROUND

The assignee of the present invention has recently developed a dual axis mirror with a single reflection surface described in U.S. patent application Ser. No. 10/384,861 filed Mar. 10, 2003 entitled "Laser Printer Apparatus Using a Pivoting Scanning Mirror". This dual axis mirror uses a first set of torsional hinges for providing oscillating beam sweep such as a resonant beam sweep and a second set of torsional hinges that selectively moves the oscillating beam sweep in a direction orthogonal to the oscillating or resonant beam sweep. By dynamically controlling the orthogonal position of the beam sweep to compensate for movement of the photosensitive medium, both directions of the resonant beam sweep may be used to print parallel image lines.

The devices of the present invention also uses torsional hinges. However, rather than a reflective surface or mirror, the device of the present invention supports a "functional surface" with the torsional hinges. Just as the mirror or reflective surface was caused to pivotally resonate about its torsional hinges, the functional surface of the present invention can be caused to pivotally resonate. The resonant frequency of the oscillation surface can then be measured to determine change in mass.

A dual axis resonant MEMS device may be fabricated out of a single piece of material (such as silicon, for example) using semiconductor manufacturing processes. The layout consists of a functional surface having dimensions on the order of a few millimeters supported on a gimbals frame by two silicon torsional hinges. The gimbals frame is supported by another set of torsional hinges, which extend from the gimbals frame to a support frame or alternately the hinges may extend from the gimbals frame to a pair of hinge anchors. A similar single axis mirror device, of course, eliminates the gimbals frame altogether by extending the single pair of torsional hinges of the device directly to the support frame or support anchors.

One presently used technique to pivotally resonate the device about a first axis is to provide electromagnetic coils on each side of the mirror and then drive the coils with an alternating signal at the desired sweep frequency. Electromagnetic coils may also be used to provide the orthogonal movement. However, when electromagnetic coils are used to provide orthogonal movement, rather than an alternating voltage, a specific DC voltage is connected across the coils to precisely position the orthogonal movement. The present invention discloses improved techniques for generating resonant pivoting.

SUMMARY OF THE INVENTION

The issues mentioned above are addressed by the present invention which, according to one embodiment, provides a torsional hinge supported surface for providing resonant pivoting of the functional surface Variations in the mass of the functional surface results in a change in the frequency of the resonant pivoting or oscillation. According to one embodiment, the apparatus comprises a resonant pivoting device including a functional surface portion. The functional surface portion of the device is supported by a first torsional hinge arrangement for pivoting around a first axis and, according to one embodiment, may also be supported on a gimbals frame by a second hinge arrangement for pivoting about a second axis substantially orthogonal to the first axis. Thus, pivoting of the functional surface device about the first axis results in resonant pivoting or oscillation of the functional surface, and pivoting of the device about the second axis results in movement of the functional surface in a direction which is substantially orthogonal to the first direction. The functional surface apparatus also includes an inertially coupled first driver circuitry for causing resonant pivoting of the functional surface about the first axis. Suitable inertially coupled drive circuits include electrostatic drive circuits and piezoelectric drive circuits. There may also be included a second drive for pivoting the functional surface device about the second axis, such as for example an electromagnetic drive circuit to provide the orthogonal movement of the functional surface.

The frequency of resonant pivoting or oscillation is then monitored to determine changes in the frequency caused by changes in mass of the functional surface portion. The functional surface portion may include one or more materials that have an affinity for or attraction for combining with specific elements or compounds thereby resulting in an increase in the effective mass of the functional surface. Alternately, the surface material could absorb a compound, such as for example, moisture, which would also result in an increase in mass. In any event, by attracting specific compounds or elements to the surface, or absorbing moisture or other compounds, the effective mass of the functional surface will be increased. Consequently, the resonant frequency of the oscillating functional surface will change as the mass of the surface changes. On the other hand, the effective mass of the functional surface might be reduced if the functional surface combined with its environment and the product of combining was a gas. Likewise, the functional surface could otherwise be consumed by environmental elements also resulting in a mass change. The change in the resonant frequency may then be determined to indicate the presence of certain compounds and even the amount of such material.

According to another embodiment, the functional surface may be divided into two or more areas with different materials in the different areas. If the mass of only one area is changed, movement about the orthogonal axis of the two axis devices can identify which of the two environments are present.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Like reference numbers in the figures are used herein to designate like elements throughout the various views of the present invention. The figures are not intended to be drawn to scale and in some instances, for illustrative purposes, the drawings may intentionally not be to scale. One of ordinary skill in the art will appreciate the many possible applications and variations of the present invention based on the following examples of possible embodiments of the present invention. The present invention relates to apparatus with a resonant pivoting functional surface supported by torsional hinges.

Figure 1:
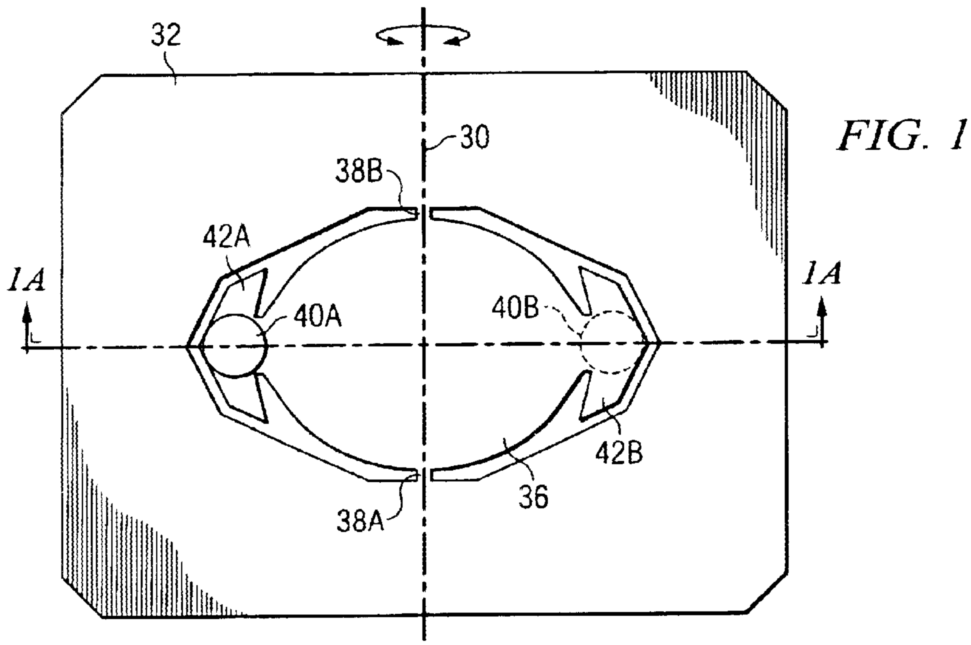
FIG. 1 illustrates an example of a single axis resonant functional surface having a support frame for generating a movement.
Figure 1A:
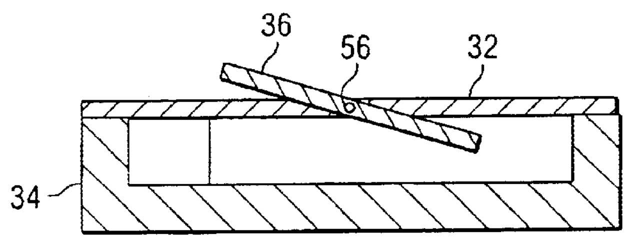
FIG. 1A is a simplified cross-sectional view taken along lines AA of FIG. 1.

Referring now to FIG. 1, there is shown a top view of a functional surface apparatus having a single pair of torsional hinges for pivoting around a first axis 30. As shown, the functional surface apparatus of FIG. 1 includes a support member 32 suitable for mounting to a support structure 34 as shown in FIG. 1A. FIG. 1A is a simplified cross-sectional view taken along line A—A of FIG. 1. A functional surface portion 36 is attached to support member 32 by a pair of torsional hinges 38A and 38B As will be discussed in more detail hereinafter, the functional surface portion 36 may be made to pivot or oscillate about axis 30 in response to various types of drive circuits. For example, the functional surface apparatus may be driven to resonant oscillation or pivoting by electromagnetic, electrostatic or piezoelectric drive circuits. When an electromagnetic circuit is to be used to control the orthogonal or vertical position of the functional surface apparatus, small magnets are typically included as indicated by dashed line areas 40A and 40B located on tabs 42A and 42B. The placement and use of the small magnets will be discussed in more detail with respect to FIGS. 14A through 14D. Although not necessary in most cases, the magnets may be mounted on the tabs 42A and 42B as shown rather than the functional surface itself to avoid contamination of the functional surface 36.

Figure 2:
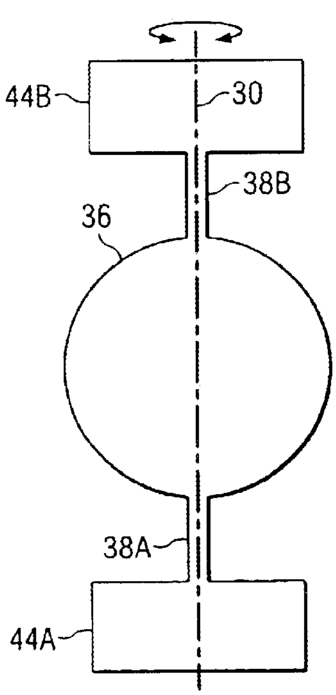
FIG. 2 is a top view of an alternate embodiment of a single axis torsional hinge functional surface supported by a pair of hinge anchors rather than a support frame.
Figure 2A:
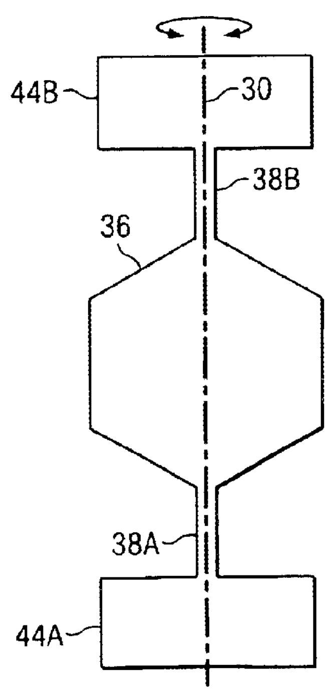
FIG. 2A is a top view of the alternate embodiment having a hexagonal shaped functional surface.

Although the functional surface apparatus of FIG. 1 includes a support member or frame 32, functional surface portion 36 may be manufactured by eliminating the support frame 32 and extending the torsional hinges 38A and 38B from functional surface portion 36 to a pair of hinge anchors 44A and 44B as shown in FIG. 2. The hinge anchors are then attached or bonded to the support structure 34 as shown in FIG. 1A. FIG. 2A illustrates that the functional surface portion 36 may have any suitable shape or perimeter such as the hexagon shape. Other suitable shapes may include oval, square or octagonal.

Figure 3A:
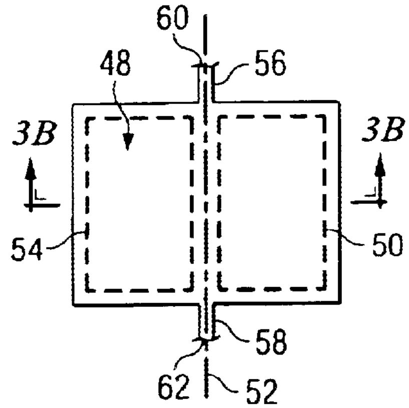
FIGS. 3A–3F illustrate how the resonating functional surface may be subdivided into distinct areas which may include various material that interact with elements or compounds that will change the effective mass of the functional surface.

FIG. 3A illustrates a top view of a functional surface 48 divided into a first area 50 located on one side of pivoting axis 52 and a second area 54 located on the other side of axis 52. Functional surface 48 is supported by a pair of torsional hinges 56 and 58 which also lie along axis 52. Functional surface 48 is equally applicable to a single axis resonant device such as illustrated and discussed with respect to FIG. 1 and FIG. 2, and a dual axis device as will be discussed hereinafter. Therefore, end 60 of hinge 56 and end 62 of hinge 58 are suitable for terminating on a support anchor or support frame when a single axis device is selected or, alternately, the hinges may even terminate on a gimbals portion, as will be discussed later, when a dual axis device is selected.

Figure 3B:
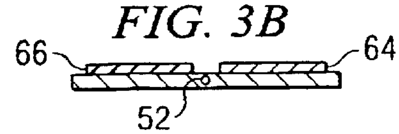

FIG. 3B is a cross-sectional view taken along line B—B of FIG. 3A. As shown in FIG. 3B, a first layer of material 64 which may have an affinity to absorb or combine with a particular element or compound has been added or applied to area 50 of the functional surface 48. As an example only, material 64 could be a layer of desiccant type materials which has an affinity to absorb moisture. In a similar manner, a second layer of material 66, which has an affinity for, or absorbs or combines with, different particular elements, may be applied to area 54 of functional surface 48. Therefore, it will be appreciated that the presence of either one of the two different particular elements will result in a change in the effective mass of the functional surface 48 which will change the resonant frequency of the functional surface 48 about torsional hinges 56 and 58.

Figure 3C:
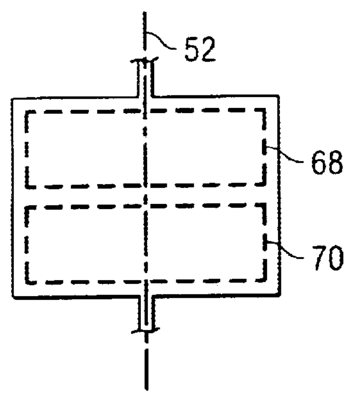

FIG. 3C is similar to FIG. 3A except whereas areas 50 and 54 were located on opposite sides of axis 52, each of areas 68 and 70 are located on both sides of axis 52.

Figure 3D:
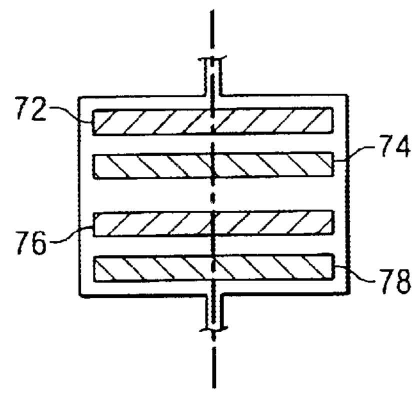
Figure 3E:
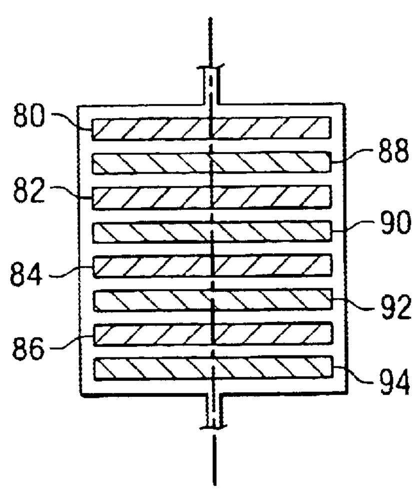
Figure 3F:
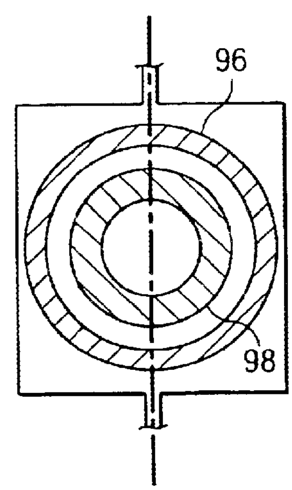
Figure 4A:
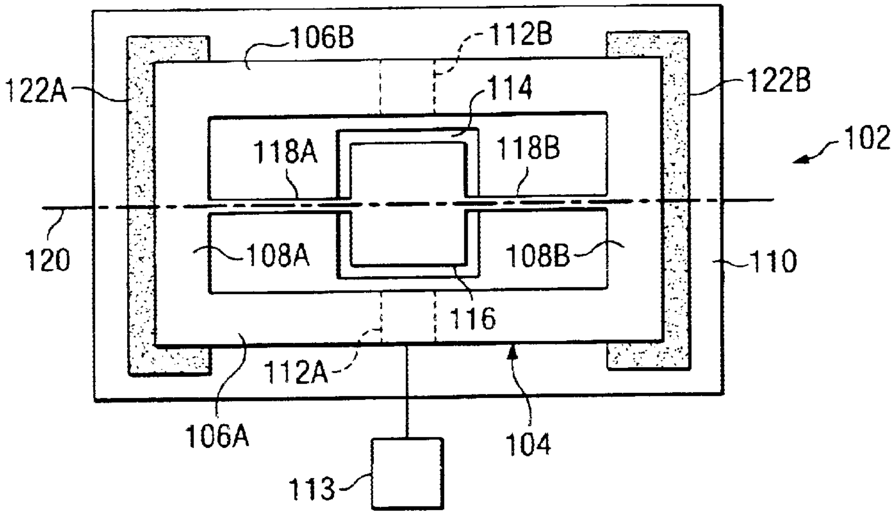
FIGS. 4A and 4B, 5A and 5B, 6A and 6B illustrate different arrangements for using inertially coupled electrostatic drive circuitry to generate the resonant scanning or pivoting about the torsional axis of a single axis functional surface.
Figure 4B:
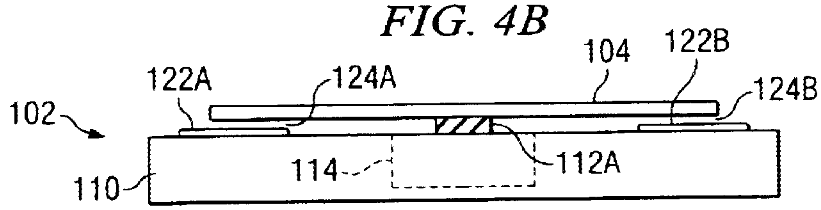

FIG. 3D illustrates another embodiment in that the functional surface 48 may be divided into four different portions 72, 74, 76 and 78, each of which may include a material having an affinity for a specific element. Similarly, FIG. 3E illustrates a first group of strip areas 80, 82, 84 and 86 having an affinity for a first specific element or compound, whereas every other strip 88, 90, 92 and 94 has an affinity for a second specific element or compound. Finally, FIG. 3F illustrates how ring areas 96 and 98 could contain the two materials having an affinity for different compounds or elements.

Referring now to FIGS. 4A and 4B, 5A and 5B and 6A and 6B, there are shown top views and side views, respectively, for driving a single axis torsional hinge device, such as functional surface 36 of FIG. 1, into resonance. As shown, according to these embodiments, the functional surface apparatus 102 includes a support frame 104 having two long sides 106A and 106B and two short sides 108A and 108B. The two long sides 106A and 106B are mounted or bonded to a support structure 110 by an adhesive or epoxy by means of stand-offs 112A and 112B. Also as shown in the side view of FIG. 4B, support structure 110 defines a cavity 114. A functional surface portion 116 is attached to the two short sides 108A and 108B by a pair of torsional hinges 118A and 118B such that the functional surface portion 116 is located above the cavity 114. As is clearly shown, the perimeter of cavity 114 is larger than the perimeter of functional surface portion 116 such that functional surface 116 can freely rotate around torsional hinges 118A and 118B without hitting the bottom of cavity 114.

As mentioned above, electromagnetic drives may be used to rotate torsional hinged supported functional surface 116 about the axis 120 by means of 118A and 118B. Such electromagnetic drives may also be used to set up resonance oscillation of the functional surface portion 116 about its axis in a manner as will be discussed below, but are more useful for orthogonally positioning the functional surface portion 116 in response to varying signals provided by a control circuitry to be discussed later. Furthermore, such electromagnetic drives require the mounting of electromagnetic coils below the functional surface thereby adding cost and taking up space.

According to one embodiment of the present invention, functional surface 116 is caused to resonate about the axis 120 by electrostatic forces. Therefore, referring again to the embodiment of FIGS. 4A and 4B, there is included a pair of electrostatic drive plates 122A and 122B located below the short sides 108A and 108B of support frame 104. Also as shown in the side view of FIG. 4B, stand-off mounting members 112A and 112B are selected such that a gap 124A and 124B exists between the bottom surface of short sides 108A and 108B and the top surface of electrostatic drive plates 122A and 122B. It has been determined that selecting the thickness of the stand-off mounting 112A and 112B such that gaps 124A and 124B are between about 0.2 $\mu$m and 0.05 $\mu$m is particularly effective. An alternating voltage is then connected between the functional surface support structure 104 and the electrostatic plates 122A and 122B.

As an example, and assuming the device is designed to have a resonant frequency about its torsional hinges that is selected to have a value somewhere between about 1 KHz and 90 KHz, if an alternating voltage also having a frequency substantially equivalent to the resonant frequency is connected across the electrostatic plates and the support frame 104, the functional surface will begin to oscillate at substantially the frequency of the applied voltage. The actual resonant frequency of the functional surface can be determined by maintaining the voltage level constant and varying the frequency of the applied voltage. A frequency in which the functional surface rotation is maximum, will be the resonant frequency. There are many techniques for determining the resonant frequency of the functional surface as it oscillates around a pair of torsional hinges, such as the means 113 coupled to the torsional hinge 112A in FIG. 4A, and persons skilled in the art will appreciate that substantially all such techniques that do not alter the effective mass of the functional surface may be used. The oscillations of the functional surface results from the vibrational forces generated by the "on/off" electrostatic forces between the functional surface support frame 104 and the electrostatic plates 122A and 122B being inertially coupled to the functional surface 116 through the torsional hinges 118A and 118B. The resonant frequency of the functional surface varies not only according to the mass and size of the functional surface itself, but also according to the length, width and thickness of the two torsional hinges 118A and 118B. It should be noted that in the embodiment of FIG. 4A, the torsional hinges 118A and 118B are not attached to the midpoint of sides of the functional surface portion 116. That is, the axis 120 lying through the torsional hinges 118A and 118B does not divide the functional surface portion 116 into two equal parts. As shown, the "bottom" portion of the illustration of functional surface 116 is larger than the "top" portion. It will be appreciated, of course, that use of the terms "bottom" portion and "top" portion is for convenience in describing the device and has nothing to do with the actual positioning of the device. Although attaching the hinges "off center" may help initiate resonance in the structure by creating an imbalance, it has been determined that resonance of the functional surface may be achieved almost as quickly if the functional surface is not off center. Furthermore, stresses may well be reduced and the required energy to maintain resonance may be somewhat less with a balanced arrangement.

Figure 5A:
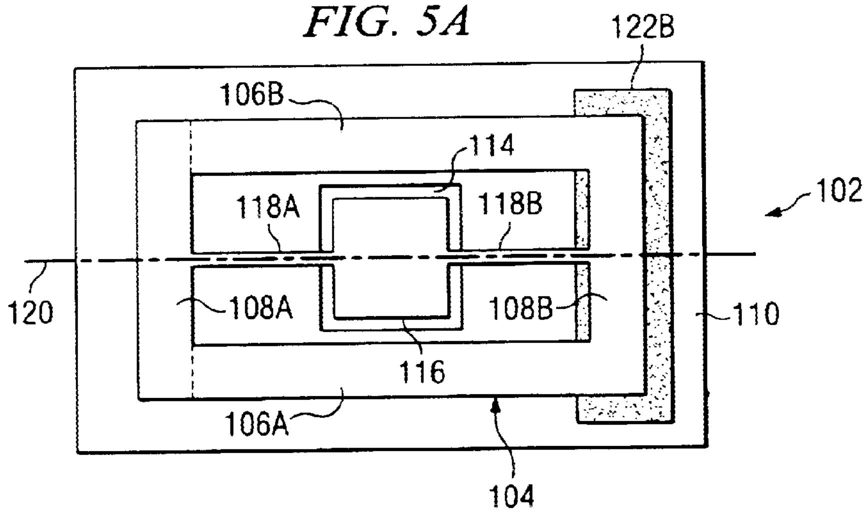
Figure 5B:
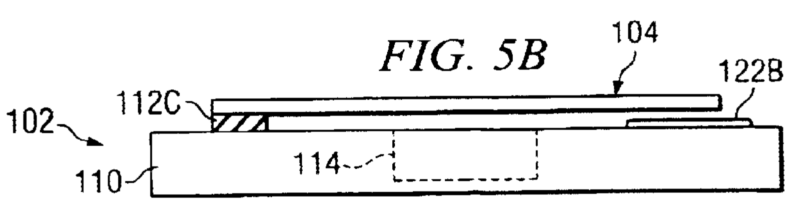

Referring now to FIGS. 5A and 5B, there is a top view and a side view, respectively, of an alternate embodiment for resonating functional surface portion 116 of the apparatus 102. The components of the functional surface structure of FIGS. 5A and 5B are substantially the same as those for FIGS. 4A and 4B discussed above. However, rather than mounting the support frame 104 to the support structure 110 at the center point of both long sides 118A and 118B, one of the two short ends such as, for example, short end 108A is mounted to support structure 110 by a single large stand-off 112C. A single electrostatic plate 122B is then located at a very small spaced distance below the other short end 108B in the same manner as discussed above with respect to FIGS. 4A and 4B. An alternating voltage source is then connected between the functional surface structure and the electrostatic plate in the same manner as discussed above.

The functional surface support frame 104 will again vibrate in response to the on/off electrostatic attraction and the energy in turn is inertially coupled to the reflective portion 116 which begins oscillating about torsional hinges 118A and 118B in the same manner as discussed above.

Figure 6A:
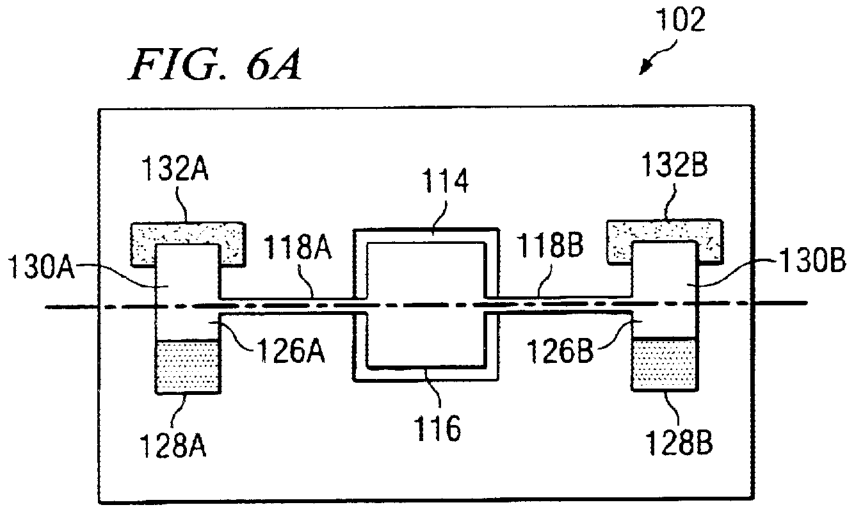
Figure 6B:
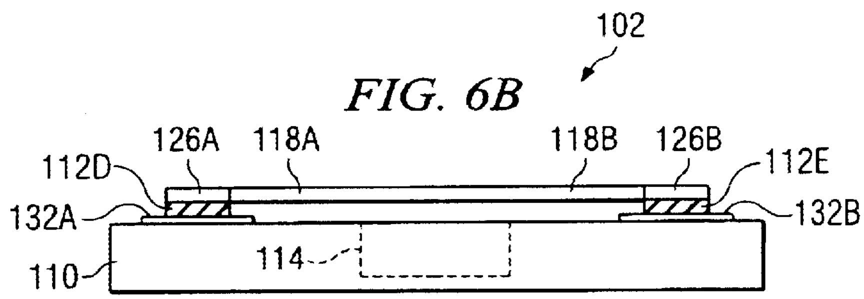

Still another embodiment is illustrated in top and side views FIG. 6A and FIG. 6B respectively. According to this embodiment, torsional hinges 118A and 118B do not extend from the functional surface portion 116 to a support frame, but instead extend to enlarged anchor members 126A and 126B. End portions 128A and 128B of the anchors 126A and 126B are located or mounted to the support structure 110 by stand-offs 112D and 112E such that the opposite end portions 130A and 130B of each anchor are suspended or spaced above electrostatic plates 132A and 132B by a small gap. Thus, in the same manner as discussed above, an alternating voltage having a frequency substantially the same as the resonant frequency of the functional surface 116 about is axis can be connected between the support anchors 126A and 126B and the electrostatic plates 132A and 132B to cause the functional surface 116 to resonant and oscillate around the torsional hinges.

Figure 7:
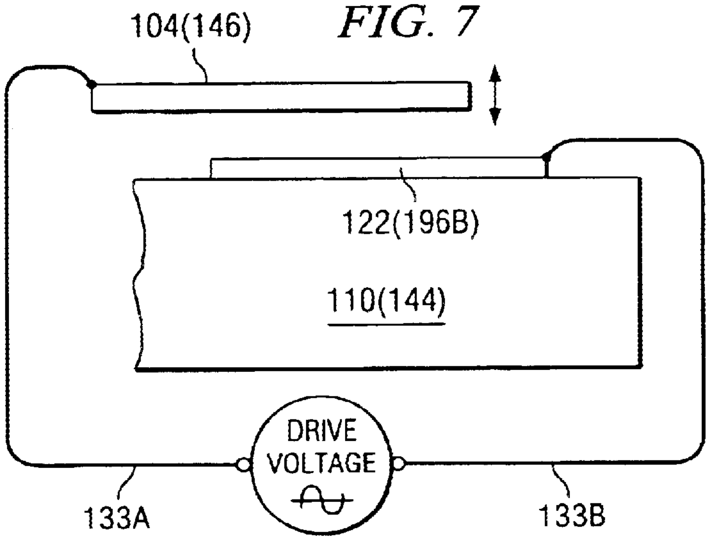
FIG. 7 illustrates the electrical connection between the electrostatic plates and the functional surface assemblies of FIGS. 4A and 4B, 5A and 5B and 6A and 6B.
Figure 8A:
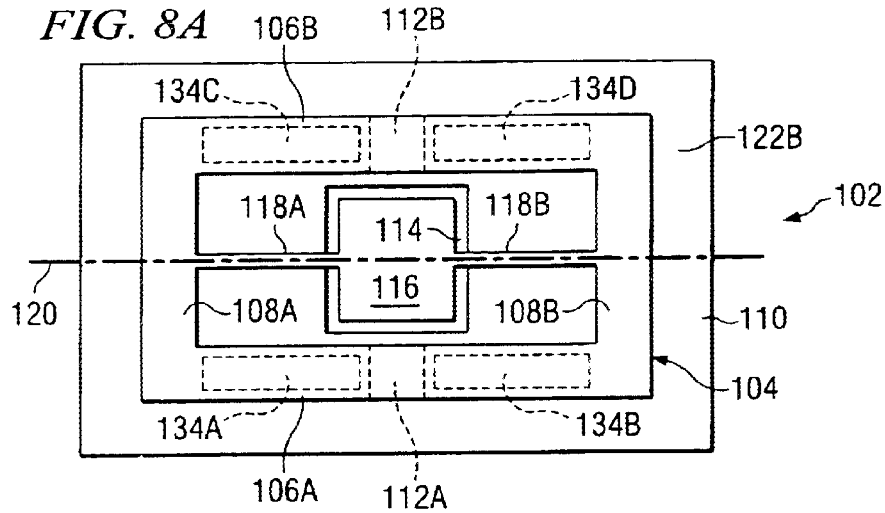
FIGS. 8A and 8B, 9A and 9B and 10A and 10B illustrate different arrangements for using piezoelectric drive circuit to generate the inertially coupled resonant scanning or pivoting about the first or resonant axis of a functional surface.
Figure 8B:
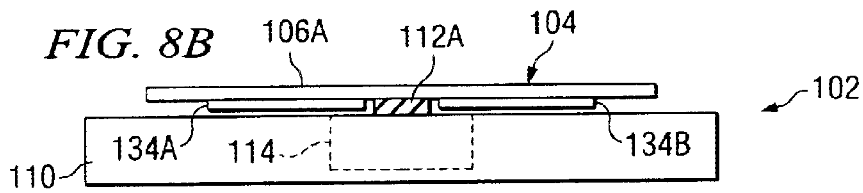
Figure 9A:
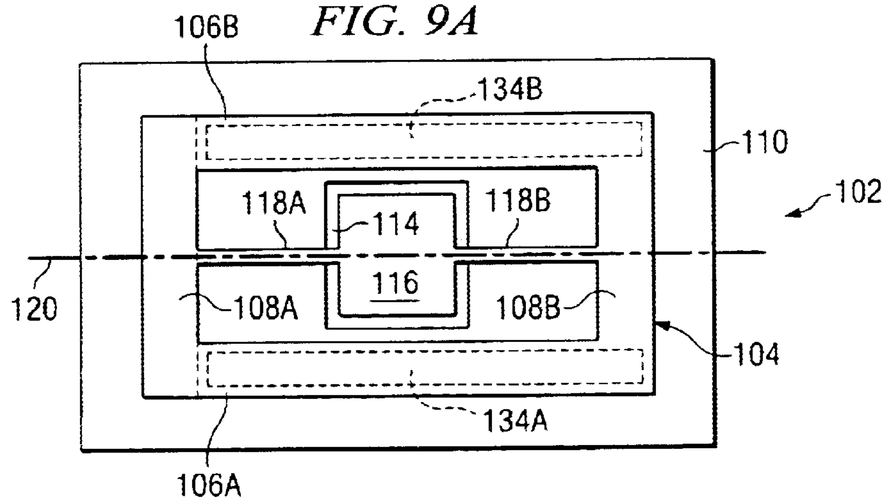
Figure 9B:
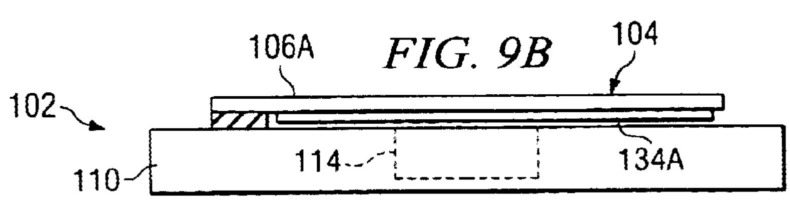
Figure 10A:
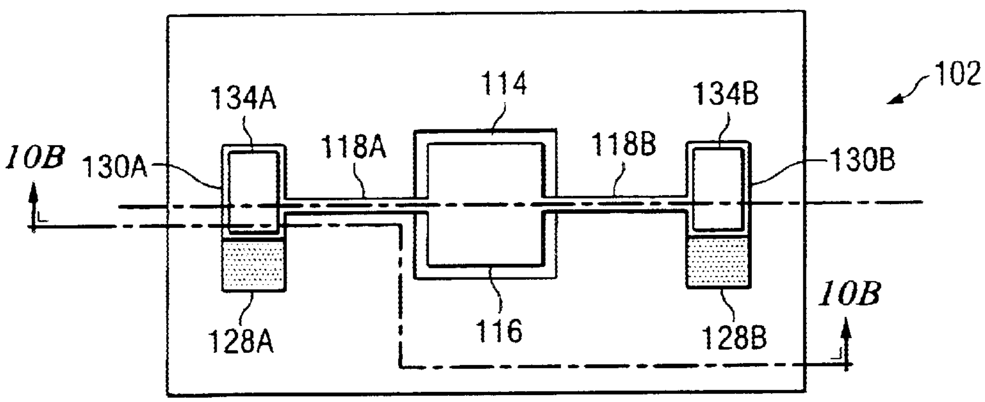
Figure 10B:
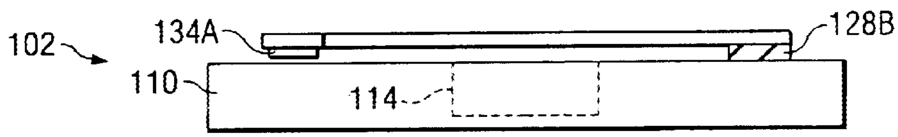

FIG. 7 is applicable to FIGS. 4A and 4B, 5A and 5B and 6A and 6B and illustrates the electrical connections 133A and 133B for applying an alternating voltage between the functional surface structure and the electrostatic plates.

FIGS. 8A and 8B, FIGS. 9A and 9B, and FIGS. 10A and 10B illustrate resonant functional surface arrangements mounted to the support structure in the same manner as discussed above with respect to FIGS. 4A and 4B, FIGS. 5A and 5B and FIGS. 6A and 6B respectively. However, rather than using electrostatic plates and electrostatic forces to generate resonant motion of the functional surface around its torsional axis, these three embodiments employ slices of piezoelectric material 134A, 134B, 134C and/or 134D bonded to the support frame 104 and/or anchors 130A and 130B. The piezoelectric material 134A–134D is sliced such that it bends or curves when a voltage is applied across the length of the strip or slice of material. As will be understood by those skilled in the art, the response time for piezoelectric material will be very fast such that an alternating voltage will cause a strip of the material to bend and curve at the same frequency as the applied voltage. Therefore, since the material is bonded to the support frame 104 or support anchors, 130A and/or 130B, the application of an alternating voltage having a frequency substantially equal to the resonance frequency of the functional surface will cause the vibration motion to be inertially coupled to the functional surface portion 116 and to thereby initiate and maintain the resonant oscillation as discussed above.

Figure 11:
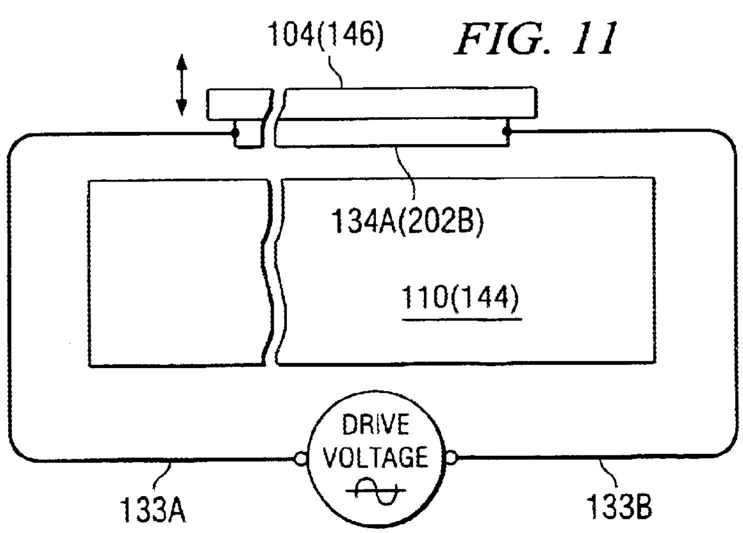
FIG. 11 illustrates the electrical connection between the piezoelectric drive material and the functional surface assemblies of FIGS. 8A and 8B, 9A and 9B, and 10A and 10B.

FIG. 11 illustrates the electrical connections for providing an alternating voltage to the functional surface structure and the two ends of piezoelectric materials.

Figure 12:
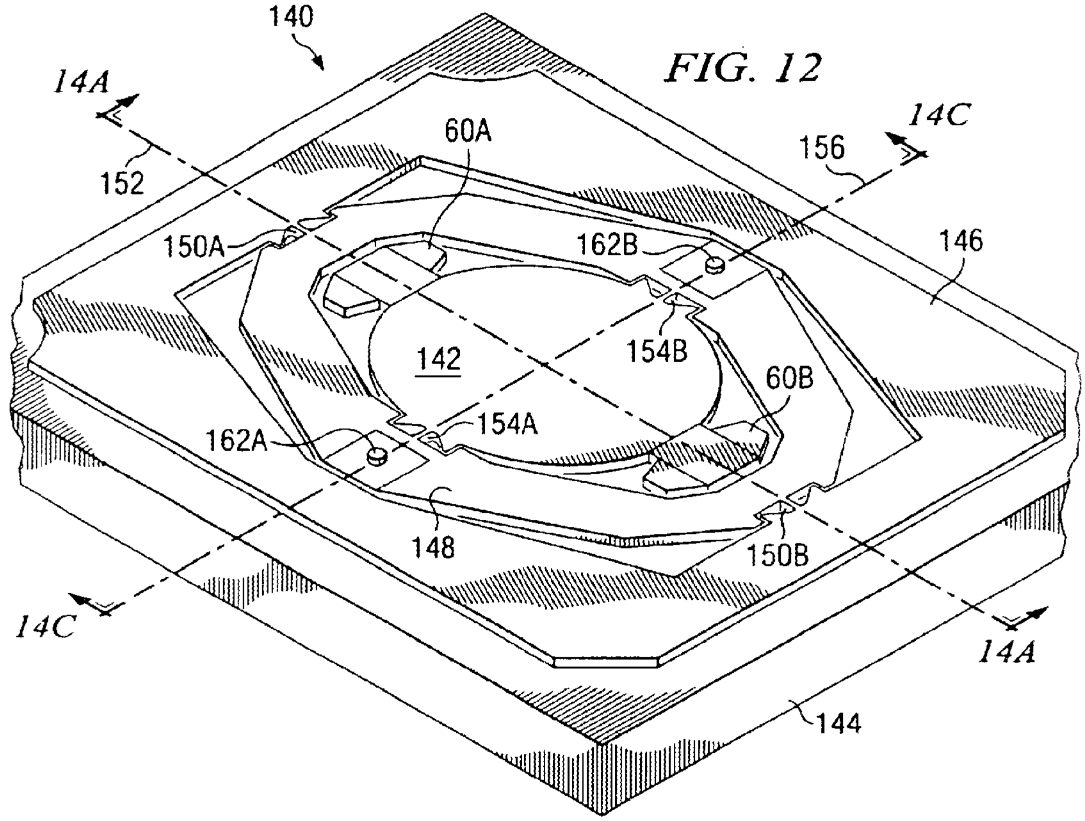
FIG. 12 is a perspective view of an embodiment of a two-axis torsional hinge functional surface having a support frame for generating the bi-directional movement according to the teachings of one embodiment of the present invention.

Referring now to FIG. 12, there is shown a perspective view of a single two-axis bidirectional functional surface assembly 140 which can be used to provide resonant pivoting as discussed above, and may also be used for adjusting the movement of the functional surface 142 in a direction orthogonal to the resonant oscillations of the functional surface. As shown, assembly 140 is illustrated as being mounted on a support structure 144. The assembly 140 may be formed from a single piece of substantially planar material and the functional or moving parts may be etched in the planar sheet of material (such as silicon) by techniques similar to those used in semiconductor art. As discussed below, the functional or moving components include, for example, the frame portion 146, an intermediate gimbals portion 148 and the inner functional surface portion 142. It will be appreciated that the intermediate gimbals portion 148 is hinged to the frame portion 146 at two ends by a first pair of torsional hinges 150A and 150B spaced apart and aligned along a first axis 152. Except for the first pair of hinges 150A and 150B, the intermediate gimbals portion 148 is separated from the frame portion 146.

The inner, centrally disposed functional surface portion 142 is centrally located thereon and is attached to gimbals portion 148 at hinges 154A and 154B along a second axis 156 that is orthogonal to or rotated 90° from the first axis. As was discussed above, a layer or coating of suitable material can be placed on the functional surface portion to interact (such as by combining with or absorbing) specific elements or compounds to change the mass of the functional surface. It will also be appreciated that the device itself may be made of a material that interacts or reacts with an element or compound that would change the effective mass. In such an instance, it would not be necessary to add a reactive material to the functional surface.

Figure 13:
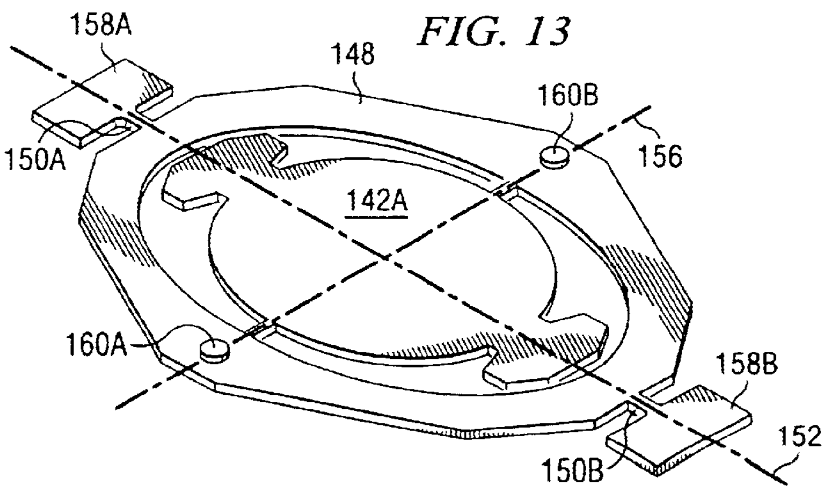
FIG. 13 is a top view of an alternate embodiment of a two-axis torsional hinge functional surface supported by "hinge anchors" rather than a support frame.

Referring now to FIG. 13, there is shown another alternate embodiment of a dual axis device. In this embodiment, the outside support frame has been eliminated such that the torsional hinges 150A and 150B extend from the gimbals frame or portion 148 to hinge anchors 158A and 158B. Hinge anchors 158A and 158B are of course used to mount or attach the dual axis device to a support structure such as discussed with respect to FIG. 12. It should also be appreciated that the operation of the dual torsional hinged functional surface of FIG. 13 operates the same as the dual torsional hinged functional surface discussed with respect to FIG. 12.

Figure 14A:
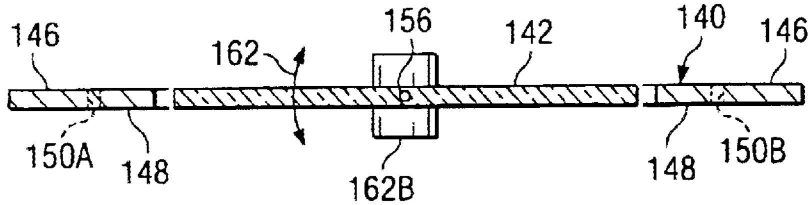
FIGS. 14A–14D are cross-sectional views of the functional surface of FIG. 12 illustrating rotation or pivoting of the two sets of torsional hinges.
Figure 14B:
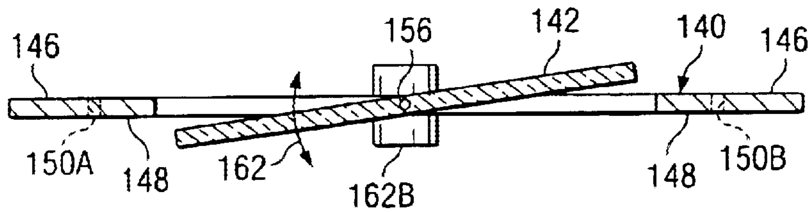
Figure 14C:
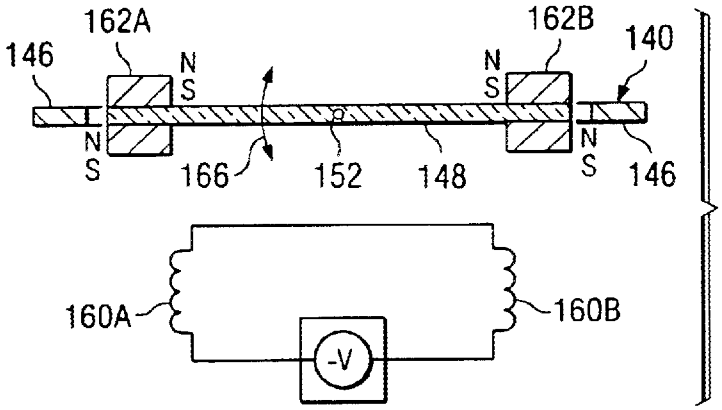
Figure 14D:
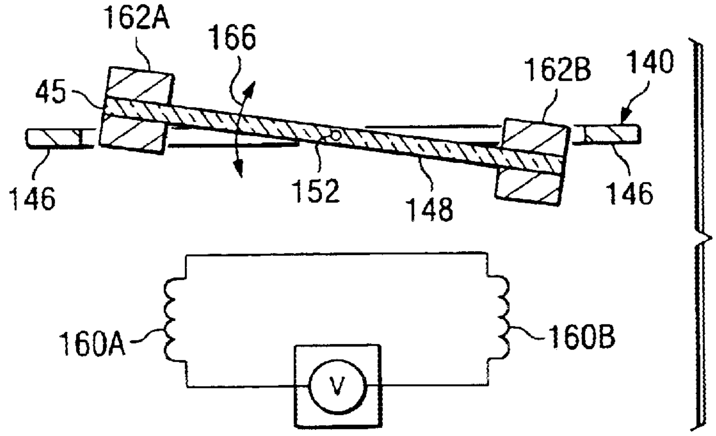

Referring to FIGS. 14, 14B, 14C and 14D along with any one of the functional surfaces illustrated in FIGS. 12 and 13, the motion of the dual axis functional surface will be explained. Assembly 140 will be discussed with respect to inertially coupled drive circuits similar to those discussed above to generate the resonant scanning or movement of the functional surface 142 about axis 156 illustrated in FIGS. 14A and 14B. The use of such inertially coupled resonance with a single dual axis device will be discussed in detail hereinafter. FIGS. 14A and 14B represent a cross-section of the dual axis device of FIG. 12 taken along lines 12A—12A (on axis 152), and FIGS. 14C and 14D are cross-sections of FIG. 12 taken along lines 12B—12B (on axis 156).

Whereas the oscillating motion of the functional surface 142 is provided by resonant drive circuits, motion of the gimbals portion 148 about axis 152 on the other hand, may be provided by another type of driver circuits such as, for example, serially connected electromagnetic coils 160A and 160B (FIGS. 14C and 14D), which are connected to computational or control circuitry for providing a control signal to provide a pair of electromagnetic forces for attracting and repelling the gimbals portion 148. The gimbals portion 148 may also include a first pair of permanent magnets 162A and 162B mounted on gimbals portion 148 along the axis 156 to enhance the operation of the electromagnetic coils. In order to symmetrically distribute mass about the rotation of axis 152 to thereby minimize oscillation under shock and vibration, each permanent magnet 162A and 162B preferably comprises an upper magnet set mounted on the top surface of the gimbals portion 148 using conventional attachment techniques such as indium bonding and an aligned lower magnet similarly attached to the lower surface of the gimbals portion 148 as shown in FIGS. 14A through 14D. The magnets of each set are arranged serially such as the north/south pole arrangement indicated in FIG. 14C. There are several possible arrangements of the four sets of magnets which may be used, such as all like poles up; or two sets of like poles up, two sets of like poles down; or three sets of like poles up, one set of like poles down, depending upon magnetic characteristics desired.

As will be discussed, pivoting about axis 152 as shown in FIGS. 14C and 14D will provide the orthogonal movement. Thus, by mounting functional surface portion 142 onto gimbals portion 148 via hinges 154A and 154B, resonant motion of the functional surface portion relative to the gimbals portion occurs about axis 156 and the orthogonal movement occurs about axis 152.

The middle or neutral position of functional surface portion 142 is shown in FIG. 14A which is a section taken through the assembly along line 12A—12A (or axis 152) of FIG. 12. Rotation of functional surface portion 142 about axis 156 independent of gimbals portion 148 and/or frame portion 146 is shown in FIG. 14B as indicated by arrow 162. FIG. 14C shows the middle position of the functional surface assembly 140, similar to that shown in FIG. 14A, but taken along line 12C—12C (or axis 156) of FIG. 12. Rotation of the gimbals portion 148 (which supports functional surface portion 142) about axis 152 independent of frame portion 146 is shown in FIG. 14D as indicated by arrow 164. The above arrangement allows independent rotation of functional surface portion 142 about the two axes which in turn provides the ability to direct the scanning or raster movement of the light beam about axis 156 and the orthogonal sweep or movement about axis 152.

Figure 15:
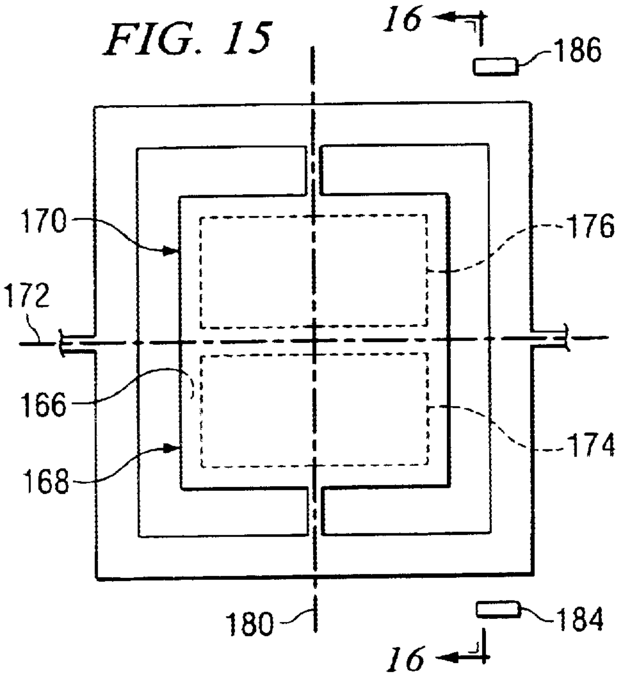
FIG. 15 is a top view and FIG. 16 is a side view of a dual axis functional surface device of this invention wherein the angular position of the device about the orthogonal axis is monitored.
Figure 16:
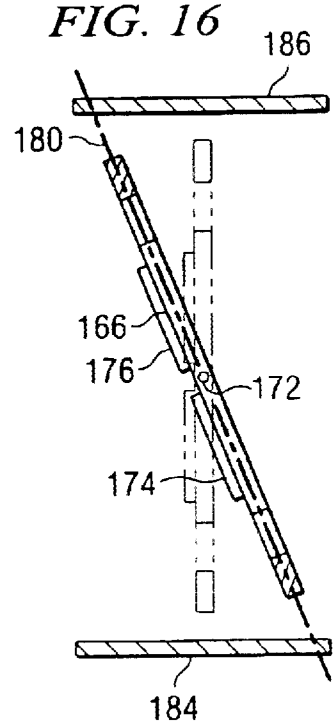

It should also be appreciated that the dual axis device may also be used with a device for measuring orthogonal movement, rather than a drive for providing orthogonal movement. For example, referring now to FIG. 15, there is shown a top view of a dual axis device wherein the functional surface 166 is divided into a first area 168 and a second area 170 located on each side of axis 172. Also as shown, each area 168 and 170 may include a layer of material as indicated at 174 and 176 respectively. As discussed above with respect to FIGS. 3A–3F, material 174 and 176 may absorb or otherwise react or interact with specific compounds or elements in the environment surrounding the functional surface so as to cause a change in the overall effective mass of the functional surface 166. However, as an example assume that materials 174 and 176 as shown in FIG. 15 will absorb a specific element and further assume that the element absorbed by material 174 is in the environment surrounding the functional surface. Therefore, side 168 with material 174 will become heavier than side 170 (i.e., gain mass). Consequently, in addition to the mass change of the functional surface causing a change in the resonant pivoting about oscillating axis 180, this off-centered weight will cause the device to rotate around axis 172 so as to change the orthogonal position of the functional surface as shown in side view 16. Suitable monitoring or measuring devices 184 and 186 are illustrated as sensors positioned to determine the change in the orthogonal position of the functional surface. Various types of monitoring devices will be suitable for this purpose including devices for monitoring capacitance changes, etc.

Figure 17A:
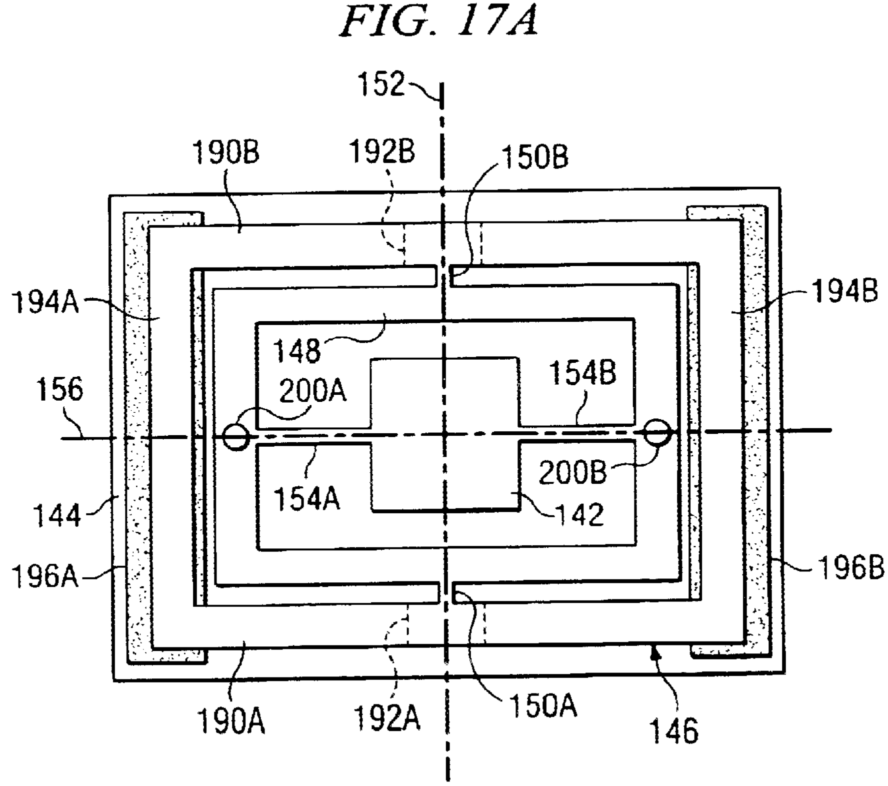
FIGS. 17A and 17B are top and side views, respectively, illustrating electrostatic drive circuitry to generate the resonant scanning or pivoting about a first pair of torsional axis and the location of the electromagnetic drive circuitry for providing orthogonal positioning of the resonant movement for a single dual axis functional surface with a support frame.
Figure 17B:
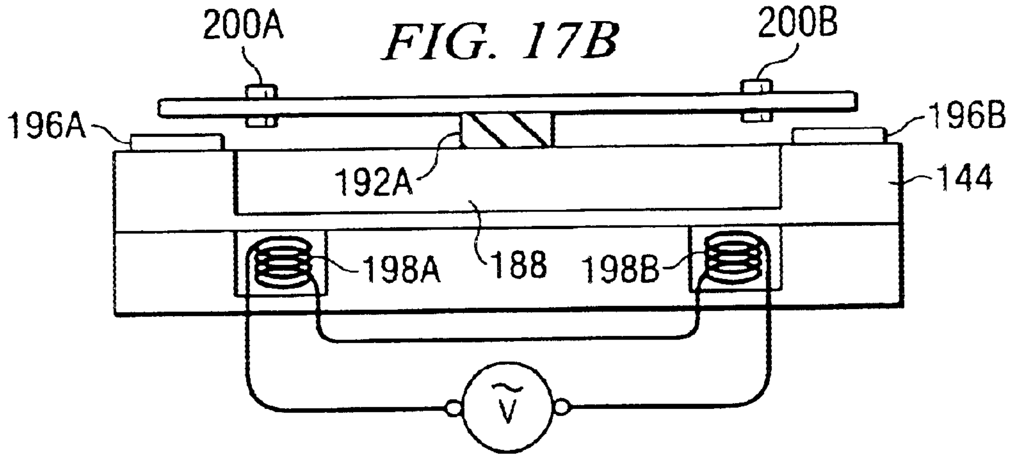
Figure 19:
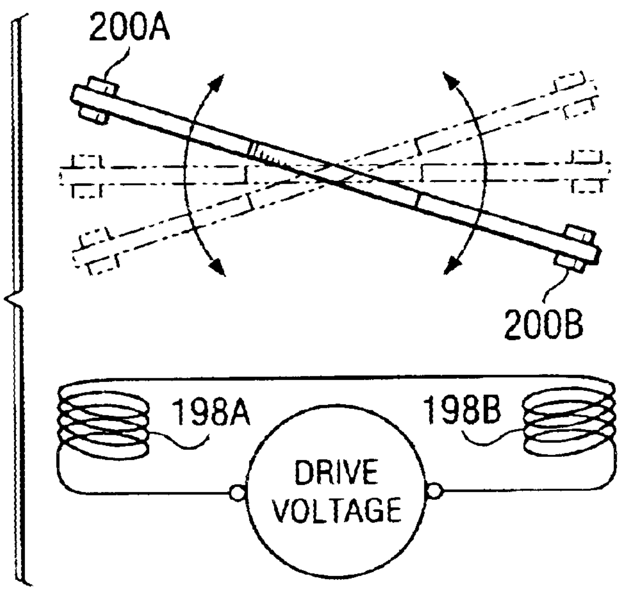
FIG. 19 illustrates the electromagnetic drive circuit for moving the scanning light beam orthogonal to the raster scan for both the electrostatic resonant scan embodiment and the piezoelectric resonant scan embodiment.

Referring now to FIGS. 17A and 17B, there is a simplified top view and side view of the functional surface apparatus for generating both the resonant frequency movement and the orthogonal movement. In a manner discussed above with respect to FIGS. 4A through 6A, a support frame 146 is mounted on a support structure 144 above a cavity 188 such that both functional surface portion 142 and gimbals portion 148 can rotate about their respective axes 156 and 152. Support frame 146 is mounted at its long sides 190A and 190B on mounts or spacing members 192A and 192B such that the short ends 194A and 194B are spaced above electrostatic drive plates 196A and 196B by a small gap on the order of between about 0.2 $\mu$m and 0.05 $\mu$m. An alternating drive voltage having a frequency which is approximately the resonant frequency of the functional surface portion 142 about its hinges, is then applied between the electrostatic drive plates and the device supporting frame 146 to generate vibrations in the apparatus as was discussed above with respect to a single axis device and as was illustrated in FIG. 7. The energy of the vibration is inertially coupled through torsional hinges 150A and 150B to gimbals portion 148 and then through hinges 154A and 154B to the functional surface portion 142. This energy vibration at approximately the resonant frequency of the functional surface portion causes the functional surface portion 142 to begin resonant oscillations about hinges 154A and 154B along axis 156 and can be used to provide the resonant movement or pivoting as discussed above. The orthogonal motion is controlled by electromagnetic coils 198A and 198B as shown in FIG. 17B and FIG. 19. As discussed above, permanent magnet sets 200A and 200B may be bonded to the gimbals portion 148 to provide better stability and performance of the orthogonal drive. It should also be understood that although the energy inertially coupled to functional surface portion 142 sets the functional surface oscillating at a full sweep and at a resonant frequency, the motion of the gimbals frame due to energy from the electrostatic plate is very slight such that the orthogonal movement can still be precisely controlled.

Figure 18A:
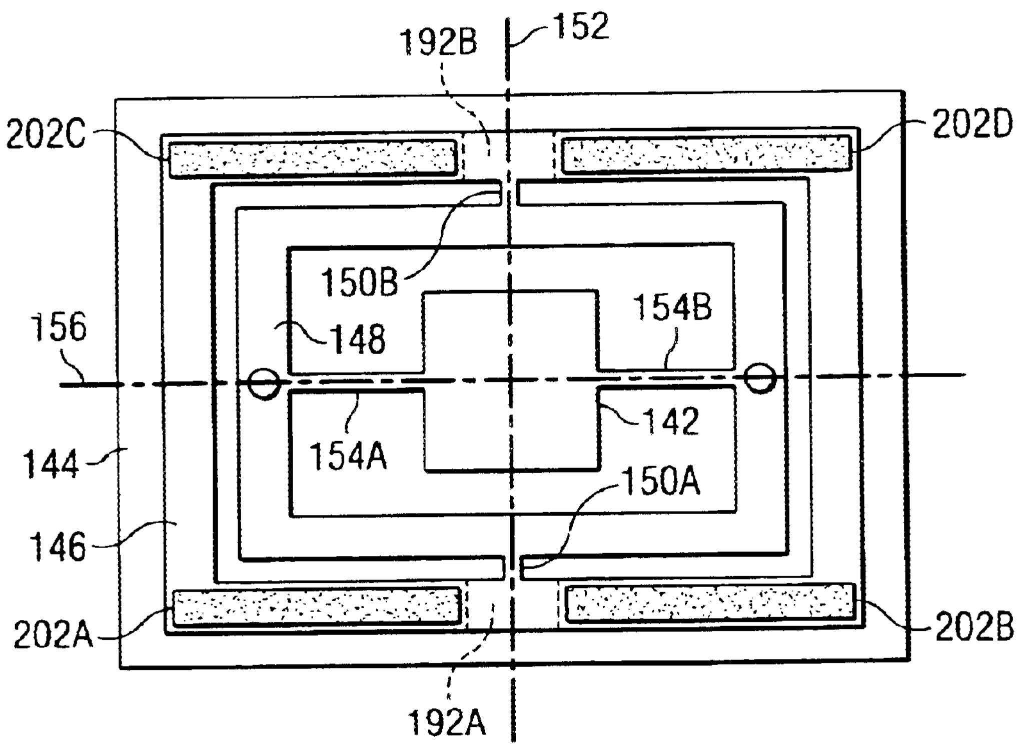
FIGS. 18A and 18B are top and side views, respectively, illustrating piezoelectric drive circuitry to generate the resonant scanning or pivoting about a first pair of torsional axis and the location of the electromagnetic drive circuitry for providing orthogonal positioning of the resonant movement for a single dual axis functional surface using hinge anchors.
Figure 18B:
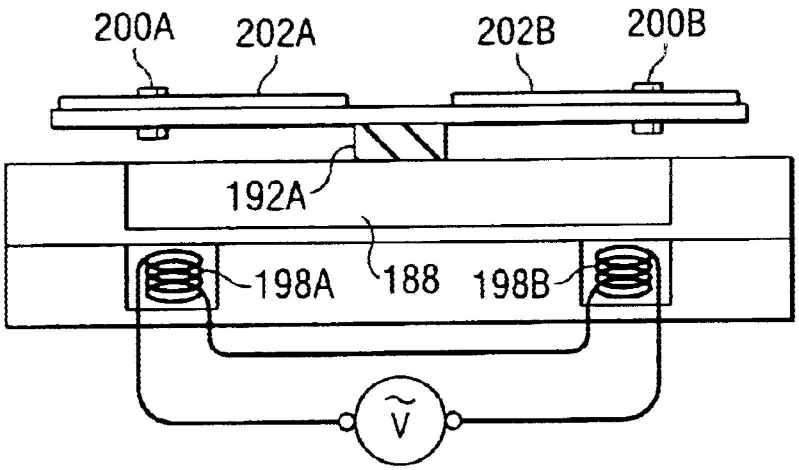

In a similar manner as discussed above with respect to single axis functional surfaces, the dual axis functional surface can also be driven to resonance by a piezoelectric drive circuit. For example, as shown in FIGS. 18A and 18B, support frame 146 is mounted to support structure 144 by mounts 192A and 192B as discussed above with respect to FIGS. 17A and 17B. However, instead of electrostatic plates, slices of piezoelectric material 202A, 202B, 202C and 202D are bonded to the support frame 146. An alternating voltage having a frequency approximately the resonant frequency of functional surface portion 142 about torsional axis 154A and 154B is applied between both ends of the slices of piezoelectric material as discussed above with respect to FIG. 11. In the same manner as discussed with respect to FIGS. 17A and 17B, vibrating energy of the functional surface resonant frequency is inertially coupled from the frame to the functional surface portion 142 so as to put the functional surface into resonant oscillation. The resonant oscillation can then be used to provide the resonant movement and an electromagnetic drive circuitry can be used to provide the necessary orthogonal motion.

The foregoing descriptions of specific embodiments of the present invention have been presented for purposes of illustration and description. They are not intended to be exhaustive or to limit the invention to the precise forms disclosed as many modifications and variations are possible in light of the above teaching. The embodiments were chosen and described in order to best explain the principles of the invention and its practical application to thereby enable others skilled in the art to best utilize the invention and various embodiments with various modifications as are suited to the particular use contemplated. It is intended that the scope of the invention be defined by the claims appended hereto and their equivalents.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. Apparatus for providing a resonant movement about a first axis, said apparatus comprising:

a device integrally formed from a single piece of material comprising a functional surface portion, and a first pair of torsional hinges attached to said functional surface portion and extending to a support portion for pivoting said functional surface portion about said first axis wherein said functional surface portion further includes a first material thereon for interacting with a second material such that the combined mass of said functional surface position and said first material is changed, and wherein said first material readily absorbs moisture;

a driver circuit for generating vibrational energy in said support portion and wherein said vibrational energy is inertially coupled from said support portion through said first pair of torsional hinges to said functional surface portion such that said functional surface portion oscillates about said first pair of torsional hinges at a resonant frequency, and wherein said resonant frequency changes with changes in the mass of said functional surface portion.

2. Apparatus for providing a resonant movement about a first axis, said apparatus comprising:

a device integrally formed from a single piece of material comprising a functional surface portion, and a first pair of torsional hinges attached to said functional surface portion and extending to a support portion for pivoting said functional surface portion about said first axis wherein said functional surface portion further includes a first plurality of materials at different locations on said functional surface, each one of said plurality for interacting with a second and different plurality of materials such that the combined mass of said functional surface and said first plurality of material is changed; and a driver circuit for generating vibrational energy in said support portion and wherein said vibrational energy is inertially coupled from said support portion through said first pair of torsional hinges to said functional surface portion such that said functional surface portion oscillates about said first pair of torsional hinges at a resonant frequency, and wherein said resonant frequency changes with changes in the mass of said functional surface portion.

* * * * *